United States Patent [19]

Baker

[11] 4,203,877
[45] May 20, 1980

[54] BLOCK OR GRAFT COPOLYMERS AND THEIR USE AS SURFACTANTS

[75] Inventor: Alan S. Baker, Slough, England

[73] Assignee: Imperial Chemical Industries Limited, London, England

[21] Appl. No.: 921,563

[22] Filed: Jul. 3, 1978

[30] Foreign Application Priority Data

Jul. 12, 1977 [GB] United Kingdom ............... 29192/77

[51] Int. Cl.² ...................... C08G 65/26; C08L 67/00
[52] U.S. Cl. ................................................. 260/18 R
[58] Field of Search ................ 260/18 R, 823, DIG. 9

[56] References Cited

U.S. PATENT DOCUMENTS

| | | | |
|---|---|---|---|
| 3,808,133 | 4/1974 | Brown | 260/18 R |
| 3,847,851 | 11/1974 | Tugukuni et al. | 260/22 CB |
| 3,980,734 | 9/1976 | Burg et al. | 260/823 |

FOREIGN PATENT DOCUMENTS 1239581 7/1960 France .
643765 9/1950 United Kingdom .
1469531 4/1977 United Kingdom .

OTHER PUBLICATIONS

Chemical Abstracts, vol. 86, 1977, p. 74,879r.

*Primary Examiner*—Ronald W. Griffin
*Attorney, Agent, or Firm*—Cushman, Darby & Cushman

[57] ABSTRACT

Block or graft copolymers useful as surfactants in oil/water systems are described. The copolymers comprise at least two polymeric components of molecular weight at least 500 which are derived from an oil-soluble complex monocarboxylic acid and a polymeric component of molecular weight at least 500 which is derived from a water-soluble polyalkylene glycol. The copolymers may be either oil-soluble or water-soluble depending on their composition and may be used as wetting agents, dispersing agents, emulsifiers or emulsion stabilizers. The oil-soluble copolymers, and their blends with low molecular weight conventional surfactants, are of particular interest for the emulsification of water in hydrocarbon fuel oils.

22 Claims, No Drawings

BLOCK OR GRAFT COPOLYMERS AND THEIR USE AS SURFACTANTS

This invention relates to novel polymeric compounds, more particularly to novel block or graft copolymers which are useful as surfactants in liquid systems consisting of an oil phase and an aqueous phase, to methods for preparing such copolymers, and to surfactant compositions containing them.

The block or graft copolymers of the invention belong to the class in which one type of polymeric component is derived from an oil-soluble complex monocarboxylic acid and another type of polymeric component is the residue of a water-soluble compound containing polyoxyalkylene chains. Certain members of this class are already known from British Pat. No. 1,469,531, namely copolymers consisting of a single block derived from the complex acid and a single block which is the residue of a polyalkylene glycol. These copolymers possess surfactant properties, but the nature of their structure limits the range of variation of their chemical composition which is possible, and hence the ability to choose a composition which affords the optimum surface active characteristics for any given oil-water system. The copolymers of the present invention overcome this disadvantage.

According to one aspect of the invention, there is provided a block or graft copolymer suitable for use as a surfactant in a system consisting of an oil phase and an aqueous phase, the copolymer having a general formula $(A—COO)_m—B$, wherein m is an integer at least 2, wherein each polymeric component A has a molecular weight of at least 500 and is the residue of an oil-soluble complex monocarboxylic acid having the general structural formula

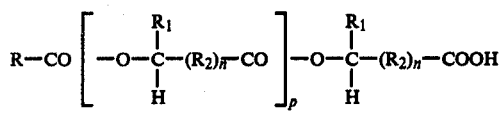

(I)

in which
R is hydrogen or a monovalent hydrocarbon or substituted hydrocarbon group;
$R_1$ is hydrogen or a monovalent $C_1$ to $C_{24}$ hydrocarbon group;
$R_2$ is a divalent $C_1$ to $C_{24}$ hydrocarbon group;
n is zero or 1;
p is an integer from zero up to 200;
and wherein each polymeric component B has a molecular weight of at least 500 and, in the case where m is 2, is the divalent residue of a water-soluble polyalkylene glycol having the general formula

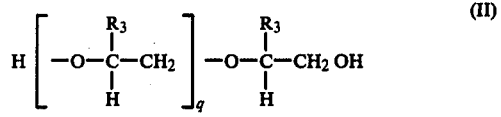

(II)

in which
$R_3$ is hydrogen or a $C_1$ to $C_3$ alkyl group;
q is an integer from 10 up to 500;
or in the case where m is greater than 2, is the residue of valency m of a water-soluble polyether polyol having the general formula

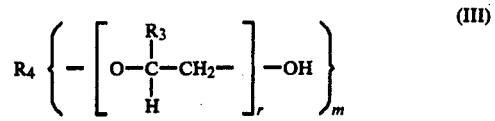

(III)

in which
$R_3$ and m have their previous significance;
r is zero or an integer from 1 to 500, provided that the total number of

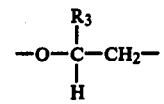

units in the molecule is at least 10;
$R_4$ is the residue of an organic compound containing in the molecule m hydrogen atoms reactive with an alkylene oxide. The units of the formula

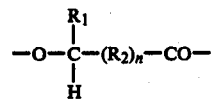

which are present in the molecule of the complex monocarboxylic acid as represented by formula I may be all the same or they may differ in respect of $R_1$, $R_2$ and n. The quantity p will not normally have the same unique value for all molecules of the complex acid but will be statistically distributed about an average value lying within the range stated, as is commonplace in polymeric materials.

Similarly, the units of the formula

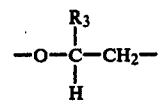

which are present in the polyalkylene glycol or the polyether polyol as represented by formula II or formula III may be all the same or they may differ in respect of $R_3$. The quantity q in formula II will normally vary statistically about an average value within the range stated, and somewhat wider variation may be deliberately introduced if desired by deriving the component B from a mixture of two or more polyalkylene glycols of differing average chain lengths. Likewise the quantity r in formula III will be subject to statistical variation about an average value within the stated range, with the additional latitude that the average value of r need not be the same for each of the m groupings linked to the residue $R_4$; in one or more of those groupings, r may indeed be zero, provided that the total number of units of the above formula in the polyether polyol molecule is not less than 10. The component B may if desired be derived from a mixture of two or more different polyether polyols.

The complex monocarboxylic acid, from which the polymeric components A are derived by the notional removal of the carboxyl group, is structurally the product of interesterification of one or more monohydroxymonocarboxylic acids together with a monocarboxylic acid free from hydroxyl groups which acts as a chain terminator. The hydrocarbon chains R, $R_1$ and $R_2$ may be linear or branched. R is preferably an alkyl group containing up to 25 carbon atoms, for example a straight-chain $C_{17}H_{35}$-group derived from stearic acid. $R_1$ is preferably a straight-chain alkyl group, and $R_2$ is preferably a straight-chain alkylene group; for example, the unit containing $R_1$ and $R_2$ may be derived from 12-hydroxy-stearic acid.

The polyalkylene glycol of the formula II, from which the polymeric component B may be derived by the notional removal of the two terminal hydroxyl groups, may be, for example, a polyethylene glycol, a polypropylene glycol, a mixed poly(ethylene-propylene) glycol or a mixed poly(ethylene-butylene) glycol, that is to say, $R_3$ may be hydrogen or a methyl or ethyl group.

The polyether polyol of the formula III, from which the polymeric component B may alternatively be derived by the notional removal of the m terminal hydroxyl groups, is the product of condensation of an alkylene oxide such as ethylene oxide and/or propylene oxide with a compound containing a plurality of active hydrogen atoms. The compounds in question may be a polyhydroxy compound such as glycerol, trimethylolpropane, pentaerythritol or sorbitol, or an external anhydride of such a polyhydroxy compound, for example anhydrosorbitan; alternatively it may be an amino compound, for example ethylene diamine, diethylene triamine, hexamethylene diamine or phenylene diamine, or an amide or a polycarboxylic acid. Where the polyether polyol is derived from a polyhydroxy compound, it is not necessarily the case that each of the original hydroxyl groups of that compound has reacted with the alkylene oxide, but any of those original hydroxyl groups which remain in the polyether polyol (i.e. where r is zero in the formula III) will normally take part in the linking of the component B to the components A in the same way as the hydroxyl groups which terminate the poly(oxyalkylene) chains.

By defining that the complex monocarboxylic acid is oil-soluble, we mean that the oil phase of the system in which the block or graft copolymer is to be used as surfactant should be better than a theta-solvent for the complex monocarboxylic acid. The significance of the expression "theta-solvent" is discussed in "Polymer Handbook" (Ed. Brandrup and Immergut, Interscience, 1966) at pages IV163–166. Briefly, this definition implies that a polymer which is dissolved in a solvent which is better than a theta-solvent therefore exists in a non-self-associated condition. The definition is usually satisfied by any liquid which would normally be referred to as a "good" solvent for the polymer in question. Considerable variation is possible in the composition of the complex monocarboxylic acid whilst meeting the requirement that the acid should be oil-soluble in the foregoing sense, according to the chosen nature of the groups R, $R_1$ and $R_2$. Generally speaking, the more the oil phase of the system tends towards a fully aliphatic character, the longer will the hydrocarbon chains of these groups need to be.

By defining that the polyalkylene glycol or polyether polyol is water-soluble, we mean similarly that the aqueous phase of the system should be better than a theta-solvent for the polyalkylene glycol or polyether polyol. In order for this requirement to be satisfied, it will usually be necessary for at least a substantial proportion of the oxyalkylene units in the polyalkylene glycol or polyether polyol to be derived from ethylene oxide.

Preferably each of the polymeric components A has a molecular weight of at least 1000 (by "molecular weight" is meant herein number average molecular weight). Thus where, for example, the group R is derived from stearic acid and the unit containing $R_1$ and $R_2$ together is derived from 12-hydroxystearic acid, p will have a value of at least 2. Similarly, it is preferred that the polymeric component B has a molecular weight of at least 1000. Thus where the component is the residue of a polyalkylene glycol which is derived from ethylene oxide exclusively, q will preferably have a value of at least 23. Similarly, where the component B is the residue of a polyether polyol which is derived from ethylene oxide as the sole alkylene oxide, the total number of oxyethylene units in the molecule will preferably be at least 23.

In any given block or graft copolymer of the general formula hereinabove defined, the weight ratio of the combined components A to the component B may vary widely. Typically the ratio will lie in the range from 9:1 to 1:9, but weight ratios outside this range may be appropriate for certain applications of the copolymers. In A—COO—B—OOC—A block copolymers, where the component B is derived from polyethylene glycol and the components A are derived from poly (12-hydroxystearic acid), the weight proportion of polyethylene glycol residues may be, for example, from 20% to 80%.

The block or graft copolymers of the invention may be obtained by procedures which are well known in the art. According to one procedure, they are prepared in two stages. In the first stage, the complex monocarboxylic acid from which the Components A are to be derived is obtained by interesterification of a monohydroxy monocarboxylic acid in the presence of a non-hydroxylic monocarboxylic acid; in the second stage, this complex monocarboxylic acid is reacted with the polyalkylene glycol or polyether polyol from which the component B is to be derived, in the ratio of m molar proportions to 1 molar proportion respectively, according to the particular value of m in the case in question. The hydroxyl group in the monohydroxymonocarboxylic acid, and the carboxyl group in either carboxylic acid, may be primary, secondary or tertiary in character. Suitable hydroxycarboxylic acids for use in the first stage include glycollic acid, lactic acid, hydracrylic acid and, in particular 12-hydroxystearic acid. The non-hydroxylic carboxylic acid which acts as a chain terminator, and hence as a means of regulating the molecular weight of the complex monocarboxylic acid, may be, for example, acetic acid, propionic acid, caproic acid, stearic acid or an acid derived from a naturally occurring oil, such as tall oil fatty acid. Commercial quantities of 12-hydroxystearic acid normally contain about 15% of stearic acid as an impurity and can conveniently be used without further admixture to produce a complex acid of molecular weight about 1500–2000. Where the non-hydroxylic monocarboxylic acid is separately introduced, the proportion which is required in order to produce a complex monocarboxylic acid of a given molecular weight can be determined either by simple experiment or by calculation.

The interesterification of the monohydroxymonocarboxylic acid and the non-hydroxylic monocarboxylic acid may be effected by heating the starting materials in a suitable hydrocarbon solvent such as toluene or xylene, which is able to form an azeotrope with the water produced in the esterification reaction. The reaction is preferably carried out in an inert atmosphere, e.g. of nitrogen, at a temperature of up to 250° C., conveniently at the refluxing temperature of the solvent. Where the hydroxyl group is secondary or tertiary the temperature employed should not be so high as to lead to dehydration of the acid molecule. Catalysts for the interesterification, such as p-toluene sulphonic acid, zinc acetate, zirconium naphthenate or tetrabutyl titanate, may be included, with the object of either increasing the rate of reaction at a given temperature or of reducing the temperature required for a given rate of reaction.

In the second stage of the first procedure for obtaining the block or graft copolymers of the invention, the complex monocarboxylic acid prepared in the first stage is reacted with the polyalkylene glycol or polyether polyol from which the component B is to be derived. For each molar proportion of the glycol or polyol, there are taken m molar proportions of the acid, according to the particular value of m in the case in question. The reaction is suitably carried out under the same conditions as have been described for the first stage.

According to the second procedure for obtaining the copolymers of the invention, the two reactions described above are carried out simultaneously, that is to say, the monohydroxy-monocarboxylic acid, the non-hydroxylic monocarboxylic acid and the polyalkylene glycol or polyether polyol are all heated together, in the same proportions as would have been taken for the first procedure, in a hydrocarbon solvent at a temperature of up to 250° C., optionally in the presence of a catalyst and observing due precautions.

The copolymers obtained by the two alternative procedures, from the same starting materials and in the same proportions, appear to be very similar in composition and characteristics but, because of its simplicity and consequent greater economy, the second procedure is to be preferred.

The novel block or graft copolymers of the invention are useful particularly by virtue of their pronounced surface active properties. Thus they are highly effective as, for example, wetting and dispersing agents, as emulsifiers and as emulsion stabilisers. A particular feature of the copolymers is that they can be either water-soluble or oil-soluble, depending principally upon the chemical composition of the polyalkylene glycol or polyether polyol residue constituting the component B, and on the weight proportion of the total molecule which it provides. For example, copolymers in which the components A are derived essentially from poly(12-hydroxystearic acid) and the component B is derived solely from polyethylene glycol, and in which the component B provides at least 65% by weight of the total copolymer, are water-soluble. On the other hand, copolymers containing 40% or less by weight of a polyethylene glycol residue component B are not only soluble in aliphatic hydrocarbons but they also have the property of solubilising in such solvents conventional low molecular surfactants such as alkylphenol/ethylene oxide condensates, which are not of themselves soluble in aliphatic hydrocarbons.

The arrangement of the polymeric components in the copolymers, and the manner in which the copolymers are prepared, permit of a greater range of compositions than is possible with some related copolymers which are proposed for use as surfactants, in particular the block copolymers of the corresponding A—COO—B type which are described in British Pat. No. 1,469,531. It is, for example, possible with the (A—COO)$_m$—B structure to formulate copolymers having a higher molecular weight for a given HLB value (HLB stands for 'Hydrophile-Lipophile Balance' and is a measure of the relative proportions of water-soluble and oil-soluble components in a surfactant; see Griffin, W.C., J. Soc. Cosmetic Chemists 1949, 1 311 and "Emulsions: Theory and Practice," p. 232 ff (P. Becher, Reinhold, 1965)). For any given surfactant function, such as detergency, emulsification or wetting, there is usually an optimum HLB value. The increase in the number of oil-soluble chains per molecule in the block or graft copolymers of the invention, as compared with the copolymers described in the above-mentioned British patent, coupled with their generally higher molecular weight, results in a higher overall solvation energy of each surfactant molecule, which is manifested in a greater emulsion stability when the surfactant has the appropriate HLB value for the system.

An example of a particular block or graft copolymer according to the invention is an (A—COO)$_2$—B block copolymer in which each A component is the residue of poly(12-hydroxystearic acid) chain-terminated with stearic acid and of molecular weight approximately 1750, and the B component is the residue of polyethylene glycol of molecular weight approximately 1500. This copolymer thus contains 30% of polyethylene glycol residues and is soluble in hydrocarbon oils, including those low in aromatic content such as low odour kerosens, diesel oil and mineral oils.

According to another aspect of the present invention there is provided a blend of from 5% to 99% by weight of a block or graft copolymer of the (A—COO)$_m$—B type as hereinbefore defined with from 1% to 95% by weight of a conventional surfactant. By a conventional surfactant we mean a surfactant in which the oil-soluble component (or each individual oil-soluble component, if more than one is present in the molecule) has a molecular weight below 500.

Such blends may be of widely varying composition; thus the conventional surfactant may be non-ionic, cationic, anionic or amphoteric in character, and it may be either water-soluble or oil-soluble. Depending upon these factors, the blends may be useful for a variety of different surfactant applications such as emulsifiers and cleaning compositions. Preferably the conventional surfactant has an oil-soluble component of molecular weight less than 350.

One class of surfactant blend according to the invention is of special interest for the emulsification of water in hydrocarbon fuel oils. For this purpose, an oil-soluble copolymer of the invention is blended with an oil-soluble conventional surfactant.

In a particular example, an (A—COO)$_2$—B block copolymer, in which each A component is derived from poly(12-hydroxystearic acid) of molecular weight 1750 and the B component is derived from polyethylene glycol of molecular weight 1500 and constitutes 30% by weight of the total copolymer, is blended with a condensate of nonylphenol with four molar proportions of ethylene oxide, preferably in the weight proportions of from 3:1 to 1:3. Another particular blend of interest for the same purpose consists of the same (A—COO)$_2$—B block copolymer as that just referred to and a condensate of a commercial blend of aliphatic alcohols containing 13 and 15 carbon atoms respectively with an average of four molar proportions of ethylene oxide, preferably in the weight proportions of from 3:1 to 1:3. These blends are capable of giving stable emulsions of up to 25% or more by weight of water in hydrocarbon fuel oils such as petrol (gasoline) kerosene and diesel oil, particularly when emulsification is effected by an emulsifying device of the high energy mechanical or ultrasonic type. If desired, the water which is thus emulsified may contain a lower alcohol, for example methanol, whereby the stability of the emulsion towards low temperatures may be enhanced and also any tendency for separation of the emulsion, because of a density difference between the two phases, is reduced.

There may also be incorporated in the foregoing blends co-solvents of low molecular weight which have some degree of surface activity in water-oil systems; examples of such co-solvents are certain alcohols, such as hexanol, nonanol and decanol.

Another class of surfactant blend according to the invention is of special interest for the preparation of water-emulsifiable cleaning compositions, which typically comprise a hydrocarbon solvent and one or more conventional surfactants as hereinbefore defined. In cases where these compositions contain hydrocarbon solvents of low aromatic content, their formulation can present difficulty because of the fact that many of the conventional low molecular weight surfactants of the ethylene oxide condensate type, whilst being soluble in aromatic hydrocarbons or in hydrocarbon mixtures containing substantial proportions of aromatic constituents, are not soluble in aliphatic hydrocarbons alone. Furthermore, such surfactants are not normally soluble in the aqueous phase into which the composition is to be emulsified. In this situation, assistance can be gained from the ability already mentioned of the block or graft copolymers of the invention to solubilise such aliphatic and hydrocarbon-insoluble surfactants. Accordingly a further blend according to the invention consists of from 98% to 40% by weight of an aliphatic hydrocarbon liquid, from 1% to 59% by weight of an oil-soluble (A—COO)$_m$—B type copolymer as hereinbefore defined and from 1% to 59% by weight of a conventional surfactant insoluble in the hydrocarbon, the combined percentage weights of the copolymer and the conventional surfactant not exceeding 60. In particular, the blend may, for example, consist of from 98% to 80% by weight of low-odour kerosene or similar aliphatic hydrocarbon of low aromatic content, from 1% to 19% by weight of an (A—COO)$_2$—B copolymer, in which each A component is derived from poly (12-hydroxy-stearic acid) of molecular weight approximately 1750 and the B component is derived from polyethylene glycol of molecular weight 1500 and constitutes 30% by weight of the total copolymer, and from 1% to 19% by weight of a condensate of nonylphenol with an average of 6 molar proportions of ethylene oxide, the combined percentage weights of the second and third constituents not exceeding 20.

Other surfactant blends incorporating the copolymers of the invention include blends which are useful as compositions for the forming of cutting oils, other metal-working fluids and fluids for hydraulic power transmission. Such compositions are customarily concentrates of mineral oil (often of low aromatic content), optionally together with other lubricants, corrosion inhibitors, etc., which are emulsifiable in water to give oil-in-water type emulsions. For this purpose, a block or graft copolymer according to the invention may be blended with an oil-soluble conventional surfactant and a water-soluble conventional surfactant, together with a mineral oil. The composition may optionally contain also a corrosion inhibitor such as a long chain amine or a petroleum sulphonate, as well as a surface-active solvent such as an aliphatic alcohol.

The invention is illustrated but not limited by the following Examples, in which parts and percentages are by weight.

EXAMPLE 1

Preparation of a block or graft copolymer of (A—COO)$_2$—B type containing 30% of polyethylene glycol mol.wt. 1500 residues, in two stages and in a single stage respectively, and use of these copolymers for emulsification of water in diesel fuel oil.

(i) 95.83 parts of a commercial grade of 12-hydroxystearic acid containing 15% of stearic acid, 17.04 parts of toluene and 0.19 part of methane sulphonic acid were heated together in a flask fitted with agitator, condenser, Dean and Stark water separator and nitrogen inlet line. Condensation was effected at 160° C. until the acid value of the polymeric monocarboxylic acid had fallen to 33 mg KOH/g. This product had a solids content of 85%; 770 parts of the product was added to 290 parts of polyethylene glycol of average mol. wt. 1500 in a similar apparatus to that used before. Xylene (8 parts) was added, the temperature was raised to 230° C. and water was removed until the acid value had fallen to 15 mg KOH/g. The product had a viscosity of 3.2 poise at 25° C., measured at 75% solids in high flash white spirit, and was obtained from the reactor at 94.8% solids.

(ii) 583 parts of the above-mentioned commercial grade of 12-hydroxystearic acid, 250 parts of polyethylene glycol mol. wt. 1500, 1.7 parts of tetrabutyl titanate and 70 parts of xylene were reacted at 200° C. in an apparatus similar to that used in (i) above, to an acid value of 5.8 mg KOH/g. The final solids content was 92.3% and the viscosity 3.6 poise at 25° C. at 75% solids in white spirit.

(iii) Each of the polymers described in (i) and (ii) (0.4 part) was dissolved separately in 80 parts of diesel fuel and 12 parts of demineralised water was emulsified into each mixture using a high-shear agitator. The two resultant emulsions were very similar in appearance and stability, both showing only slight separation after 48 hours.

EXAMPLE 2

A block copolymer of similar type to that described in Example 1 (ii) but containing 39% polyethylene glycol residues was prepared, in the manner described in that Example, from 314.2 parts of polyethylene glycol mol. wt. 4000, 141.4 parts of polyethylene glycol mol. wt. 1500, 700 parts of commercial 12-hydroxystearic acid, 2.4 parts of tetrabutyl titanate and 41 parts of xylene; the product was condensed to an acid value of 5.0 mg KOH/g and the solids content was 90.5%.

EXAMPLE 3

A block copolymer similar to that of Example 1 (ii) but containing 50% polyethylene glycol residues was prepared, in the manner described in that Example from 523.6 parts of polyethylene glycol mol. wt. 4000, 59.0 parts of polyethylene glycol mol. wt. 1500, 583.3 parts of commercial 12-hydroxystearic acid, 2.3 parts of tetrabutyl titanate and 60 parts of xylene. The product was condensed to an acid value of 5.3 KOH/g and the solids content was 92.1%.

EXAMPLE 4

A block copolymer similar to that of Example 1 (ii) but containing 62% polyethylene glycol residues was prepared, in the manner described in that Example, from 713.4 parts of polyethylene glycol mol. wt. 4000, 437.5 parts of commercial 12-hydroxystearic acid, 2.3 parts tetrabutyl titanate and 90 parts of xylene; the product was condensed to an acid value of 5.9 mg KOH/g and the solids content was 91.2%.

EXAMPLE 5

A block copolymer of lower molecular weight than that described in Example 1 (ii) and containing 30% polyethylene glycol residues was prepared, in the manner described in that Example, from 303 parts of polyethylene glycol mol. wt. 1000, 54 parts of tall oil fatty acids, 643 parts of commercial 12-hydroxystearic acid and 52 parts of xylene; the product was condensed to an acid value of 5.9 mg KOH/g and the solids content was 94.5%.

EXAMPLE 6

Emulsions were prepared by blending in a high-shear agitator 85 parts of diesel fuel oil, 15 parts of dimineralised water and each in turn of the following surfactant additions:

(i) 0.45 parts of a condensate of nonylphenol with an average of 4 molar proportions of ethylene oxide;

(ii) 0.48 parts of the block copolymer described in Example 1 (ii);

(iii) 0.225 parts of a condensate of nonylphenol with an average of 4 molar proportions of ethylene oxide and 0.24 part of the block copolymer described in Example 1 (ii).

The emulsion from combination (i) broke within a few minutes of agitation being stopped; those from combinations (ii) and (iii) separated only slowly, that from (iii) showing significantly less separation than that from (ii) after 7 days storage.

EXAMPLE 7

An emulsion of water in diesel fuel oil which was stable at temperatures down to $-15°$ C. was prepared by incorporating, by means of a high-shear agitator, 3.75 parts of methanol and 11.25 parts of demineralised water into 85 parts of the oil containing 0.24 parts of a condensate of nonylphenol with an average of 4 molar proportions of ethylene oxide and 0.24 parts of the block copolymer described in Example 1 (ii). This emulsion showed little separation after standing for 1 week.

EXAMPLE 8

Into 80 parts of kerosene were mixed 4 parts of a commercial mixture of $C_{13}$ and $C_{15}$ primary aliphatic alcohols, 0.62 part of the block copolymer described in Example 1 (i) and 0.6 part of a commercial low molecular weight non-ionic surfactant which is essentially a condensate of the foregoing commercial primary alcohol mixture with an average of 4 molar proportions of ethylene oxide. Into this oil-phase was then emulsified 40 parts of dimineralised water, using a high-shear agitator. The resultant emulsion showed little separation after 48 hours.

EXAMPLE 9

A water-in-mineral oil emulsion was prepared with the aid of a high-shear agitator by adding 10 parts of demineralised water to 90 parts of a mineral oil containing 0.15 part of the block copolymer described in Example 1 (i) and 0.15 part of the non-ionic surfactant described in Example 8. This emulsion showed little separation after 24 hours.

EXAMPLE 10

5 Parts of a condensate of nonylphenol with an average of 6 molar proportions of ethylene oxide and 5 parts of the block copolymer described in Example 1 (ii) were added to 90 parts of low odour kerosene to give a clear solution (the nonylphenol condensate alone is insoluble in this kerosene). 5 parts of this solution were emulsified in 95 parts of water, heated to $80°$ C. and sprayed onto a metal panel coated with a film of heavy fuel oil. The panel was substantially cleaned of oil in 3 minutes.

I claim:

1. A copolymer suitable for use as a surfactant in a system consisting of an oil phase and an aqueous phase, the copolymer containing at least two polymeric components which are derived from oil-soluble complex monocarboxylic acids and another polymeric component which is the residue of a water-soluble compound containing polyoxyalkylene chains, characterized in that the copolymer has the general formula (A—COO)$_m$—B, wherein m is an integer at least 2, wherein each polymeric component A has a molecular weight of at least 500 and is the residue of an oil-soluble complex monocarboxylic acid having the general structural formula

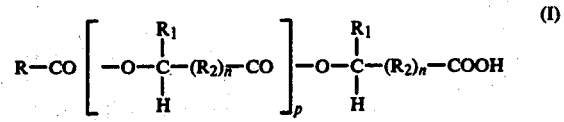

in which
R is hydrogen or a monovalent hydrocarbon or substituted hydrocarbon group;
$R_1$ is hydrogen or a monovalent $C_1$ to $C_{24}$ hydrocarbon group;
$R_2$ is a divalent $C_1$ to $C_{24}$ hydrocarbon group;
n is zero or 1;
p is an integer from zero up to 200;
and wherein each polymeric component B has a molecular weight of at least 500 and, in the case where m is 2, is the divalent residue of a water-soluble polyalkylene glycol having the general formula

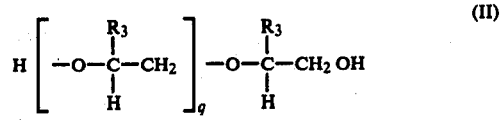

in which
$R_3$ is hydrogen or a $C_1$ or $C_3$ alkyl group;
q is an integer from 10 up to 500;
or in the case where m is greater than 2, is the residue of valency m of a water-soluble polyether polyol having the general formula

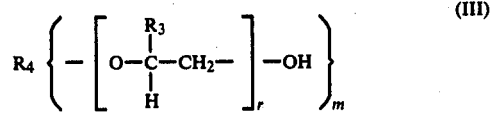

in which
R₃ and m have their previous significance;
r is zero or an integer from 1 to 500, provided that the total number of

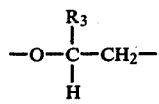

units in the molecule is at least 10;
R₄ is the residue of an organic compound containing in the molecule m hydrogen atoms reactive with an alkylene oxide.

2. A copolymer according to claim 1, in which each of the polymeric components A has a molecular weight of at least 1000.

3. A copolymer according to claim 1 or claim 2, in which the polymeric component B has a molecular weight of at least 1000.

4. A copolymer according to claim 3, in which m is 2, the polymeric components A are derived from poly (12-hydroxystearic acid) chain-terminated with stearic acid and the polymeric component B is derived from polyethylene glycol.

5. A copolymer according to claim 4 which is water-soluble and in which the component B constitutes at least 65% by weight of the total copolymer.

6. A copolymer according to claim 4 which is soluble in aliphatic hydrocarbons and in which the component B constitutes not more than 40% by weight of the total copolymer.

7. A copolymer according to claim 6 in which each polymeric component A is of molecular weight approximately 1750 and the B component is of molecular weight approximately 1500, the B component constituting 30% by weight of the total copolymer.

8. A copolymer according to claim 2, in which m is 2, the polymeric components A are derived from poly (12-hydroxystearic acid) chain-terminated with stearic acid and the polymeric component B is derived from polyethylene glycol.

9. A copolymer according to claim 8 which is water-soluble and in which the component B constitutes at least 65% by weight of the total copolymer.

10. A copolymer according to claim 8 which is soluble in aliphatic hydrocarbons and in which the component B constitutes not more than 40% by weight of the total copolymer.

11. A copolymer according to claim 10 in which each polymeric component A is of molecular weight approximately 1750 and the B component is of molecular weight approximately 1500, and B component constituting 30% by weight of the total copolymer.

12. A copolymer according to claim 1 in which m is 2, the polymeric components A are derived from poly (12-hydroxystearic acid) chain-terminated with stearic acid and the polymeric component B is derived from polyethylene glycol.

13. A copolymer according to claim 12 which is water-soluble and in which the component B constitutes at least 65% by weight of the total copolymer.

14. A copolymer according to claim 12 which is soluble in aliphatic hydrocarbons and in which the component B constitutes not more than 40% by weight of the total copolymer.

15. A copolymer according to claim 14 in which each polymeric component A is of molecular weight approximately 1750 and the B component is of molecular weight approximately 1500, the B component constituting 30% by weight of the total copolymer.

16. A blend of from 5% to 99% by weight of a copolymer according to claim 1 with from 1% to 95% by weight of a surfactant in which the oil-soluble component has a molecular weight below 500.

17. A blend of from 98% to 40% by weight of an aliphatic hydrocarbon liquid, from 1% to 59% by weight of a copolymer according to claim 14 and from 1% to 59% by weight of a surfactant insoluble in the hydrocarbon the oil-soluble component of which has a molecular weight below 500, the combined weights of the copolymer and the surfactant not exceeding 60% of the total blend.

18. A blend of a copolymer according to claim 15 with a condensate of nonylphenol with four proportions of ethylene oxide, in the weight proportions of from 3:1 to 1:3 respectively.

19. A blend of from 98% to 40% by weight of an aliphatic hydrocarbon liquid, from 1% to 59% by weight of a copolymer according to claim 8 and from 1% to 59% by weight of a surfactant insoluble in the hydrocarbon the oil-soluble component of which has a molecular weight below 500, the combined weights of the copolymer and the surfactant not exceeding 60% of the total blend.

20. A blend of copolymer according to claim 11 with a condensate of nonylphenol with four molar proportions of ethylene oxide, in the weight proportions of from 3:1 to 1:3 respectively.

21. A blend of from 98% to 40% by weight of an aliphatic hydrocarbon liquid, from 1% to 59% by weight of a copolymer according to claim 4 and from 1% to 59% by weight of a surfactant insoluble in the hydrocarbon the oil-soluble component of which has a molecular weight below 500, the combined weights not exceeding 60% of the total blend.

22. A blend of copolymer according to claim 6 with a condensate of nonylphenol with four molar proportions of ethylene oxide, in the weight proportions of from 3:1 to 1:3 respectively.

* * * * *